Sept. 20, 1966 L. NATHANSON 3,274,519

FREQUENCY SELECTIVE COUPLING DEVICE HAVING
FERRITE ELEMENTS BIASED TO DIFFERENT
RESONANT FREQUENCIES
Filed Feb. 5, 1964

INVENTOR.
LESLIE NATHANSON

BY *Robert S. Toperzer*
*Atty.*

United States Patent Office 3,274,519

Patented Sept. 20, 1966

3,274,519

FREQUENCY SELECTIVE COUPLING DEVICE HAVING FERRITE ELEMENTS BIASED TO DIFFERENT RESONANT FREQUENCIES

Leslie Nathanson, Boston, Mass., assignor to Laboratory for Electronics, Inc., Boston, Mass., a corporation of Delaware Filed Feb. 5, 1964, Ser. No. 342,608
8 Claims. (Cl. 333—1.1)

Figure 1:
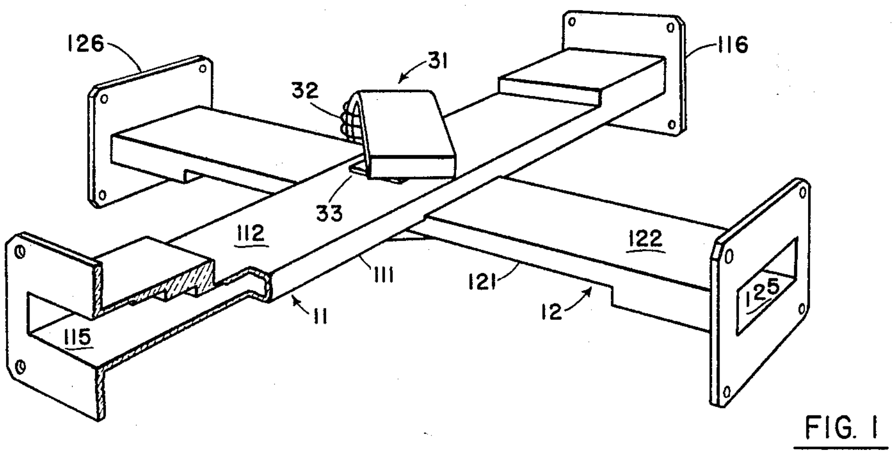

This invention relates to wave energy coupling devices and, more particularly, it is concerned with a ferromagnetic coupling device which is adapted to operate as a discriminator for wave energy in the microwave region.

One of the problems that has been encountered with backward wave oscillators, and to a lesser degree, other types of oscillators which operate in the microwave region is frequency instability. Not only does the oscillator frequency tend to drift in the absence of control circuitry for standardizing purposes, but also it exhibits fluctuations about an average value which is subject to drift. Although the magnitude of these fluctuations is not nearly as great as the long term frequency excursions, the effect is nevertheless an especially difficult one to avoid because the frequency and amplitude of these fluctuations tend to vary at random. This imposes a limitation on the use of the oscillator, as in the case, for example, where the oscillator signal is to be frequency modulated or is to serve as a standard for comparison purposes. In these and many other applications of microwave oscillators, therefore, it has been a practice to provide means for suppressing this kind of undesired frequency modulation as well as for standardizing the center or average frequency of the oscillator.

A device that has been used successfully for this purpose is a dual mode cavity which is resonant at two distinct frequencies, one a small amount above the desired oscillator frequency, and the other below the oscillator frequency by the same amount. In operation, a sample of the oscillator output signal is fed into the cavity and, in response thereto, two output signals are derived whose relative amplitudes depend upon the displacement of the oscillator frequency with respect to the cavity resonance frequencies. That is to say, when the oscillator frequency is the same as the lower of these cavity resonant frequencies, then the amplitude of one of the signals obtained from the cavity will be a maximum, while the amplitude of the other signal will be relatively small. The same will be true when the oscillator frequency corresponds to the upper cavity resonance frequency, except that the sense of the amplitude difference between the signals will be reversed. When the oscillator frequency is centered between the resonant frequencies of the cavity, however, then the signals will have the same amplitude, and it is as a function of this amplitude difference between the signals that a suitable error signal is derived to control the oscillator frequency.

One of the chief reasons that a dual mode cavity is preferred over other types of resonant devices for this application is that the frequency separation of the resonant modes of the cavity remains essentially constant, inasmuch as dimensional changes in the cavity tend to affect both modes alike. A disadvantage of this device, however, is that it is difficult to tune over a wide range of frequencies and, furthermore, tuning must be accomplished mechanically by changing the dimensions of the cavity. This rules out many applications where the operating frequency requires frequent and rapid shifting as in frequency diversity communications system, for example.

Accordingly, it is an object of the present invention to provide an electrically tunable coupling device which is adapted for use as a discriminator in the microwave frequency region.

Another object is to achieve high frequency stability in this device.

Still another object is to provide a device which is simple to construct in that it has few parts and does not require close dimensional tolerances to establish the desired operating frequency.

A further object is to provide a reasonably compact device of this kind.

Figure 2:
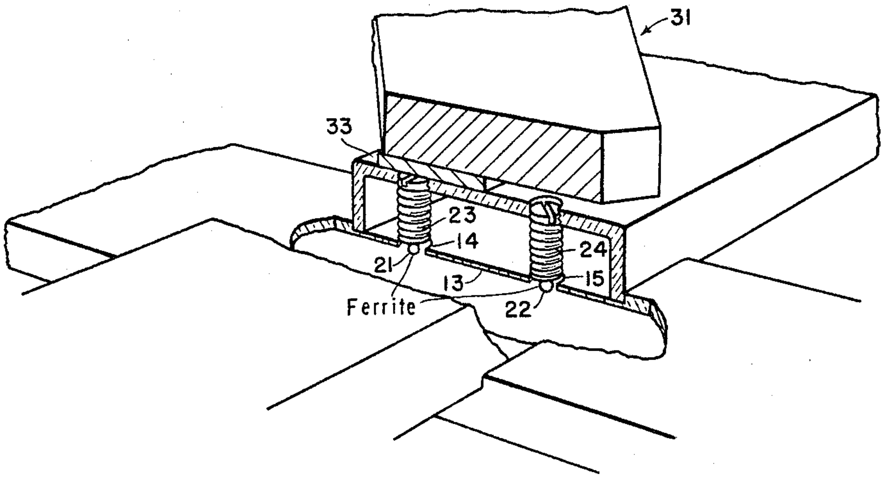
Figure 3:
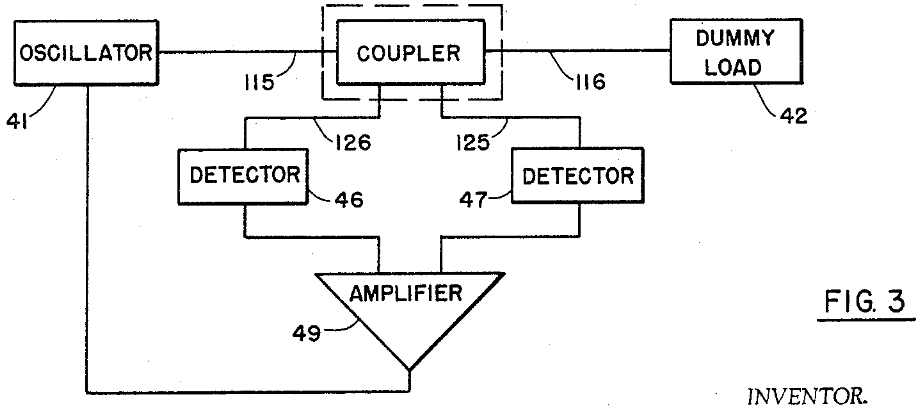

The novel features of the invention, together with further objects and advantages thereof, will become apparent from the following detailed description of a preferred embodiment and the drawing to which the description refers. In the drawing, FIG. 1 is a perspective view of the device in accordance with the present invention with a portion cut away to show more clearly the waveguide transitions employed in the device;

FIG. 2 is an enlarged perspective view of the region where the waveguides overlap with portions cut away to show more clearly the relation of the guides and the coupling arrangement employed between them; and FIG. 3 is a block diagram of a discriminator circuit embodying the device according to the invention.

With reference now to the drawing and more particularly to FIG. 1, it will be observed that the numerals 11 and 12 designate generally a pair of rectangular waveguide sections each having broad and narrow walls. The broad walls of guide 11, which will hereafter be termed the main guide are designated 111, 112 while the broad walls of guide 12 which will hereafter be termed the auxiliary guide, are designated 121 and 122. The main and auxiliary guides are disposed at right angles in overlapping relation to one another so that wall 111 of the main guide intersects with wall 122 of the auxiliary guide. The widths of the broad walls forming the intersection are approximately four times as great as the narrow walls of the respective guides.

At the intersection itself there is single common wall 13 (FIG. 2), which is thinner than either of walls 112 or 122 taken separately. A thickness for wall 13 of seventeen thousandths of an inch has been found to work out well in actual practice. In the wall 13, are formed a pair of round irises or holes 14, 15, which are equally displaced from the respective guide axes. Specifically, the holes are displaced off axes in the same direction with respect to the longitudinal axis of guide 12, and in opposite directions from the longitudinal axis of guide 11. The amount of displacement, which has been used successfully is one-half the distance from the center to the respective edges of the guides. The holes may be formed most conveniently by drilling through the wall 112 of guide 11 after the guides have been joined together.

At both ends of the auxiliary and main guide sections there are provided step transitions for impedance matching to guides of standard dimensions. As is well known, these have broad walls that are approximately twice as wide as the narrow walls. The transition is accomplished with four steps in the wall 112 which are spaced in the neighborhood of one-quarter wave length apart. This type of transition is preferred because it can be carried out in a relatively short length of guide. However, any other type of transition can be used, such as for example a uniform taper, since the type of transition is immaterial insofar as the principles of the invention are concerned. Rather, it is only significant that the transition provide a good match between the impedance of standard size guide and that of the guide sections 11 and 12 whose impedance is substantially less than that of standard size guide.

Coupling between the guides is afforded by a pair of ferrite elements 21 and 22 which are centered in the region defined by holes 14 and 15, respectively. These elements are spherically shaped and have a diameter which is about half that of the holes. This diameter being greater than the thickness of wall 13, it follows that the ferrite elements project a bit above and below the surface of wall 13 into the interior regions of the guides. To mount the ferrite elements in this position, there are provided insulator posts 23 and 24 and the ferrite elements are cemented to the tips of these posts. The posts which may be made of Teflon or other high dielectric strength insulating material are threaded into the holes in the wall 112, which serves to fix their position.

The ferrite elements themselves are of a narrow line width type material, such as highly polished single crystal Yttrium Iron Garnet. These elements are available commercially and are fabricated from a single crystal by a tumbling process in which successively finer and finer grits are used. They have a line width in the neighborhood of .3 to .5 oersteds. Although the orientation of the crystallographic axis of the elements affects their frequency response, this is not of primary significance in the device of the invention. However for minimum temperature dependence, the elements should be oriented so that a radial axis at right angles to wall 13 is displaced from the (.001) axis of the elements by an angle of 21° in the (100) crystal plane. A more detailed explanation of the crystal structure and the nomenclature used to define it can be found in "Introduction to Solid State Physics" by Kittel (John Wiley & Sons, Inc., 1953).

Finally, there is provided according to the invention an electromagnet 31 whose poles extend adjacent the walls 112 and 121 in the region where the waveguides overlap. A conventional C shaped magnet is suitable for this purpose and the field strength required for X-band operation, by way of example, is in the range of from 2500 to 4000 oersteds. This range is obtained simply by varying the amount of current supplied to the coil 32 of the magnet. Also there is a small piece of magnetic material 33 interposed between one of the magnet poles and the wall 112 in order to make the strength of the magnetic field acting on ferrite element 21 slightly greater by a fixed amount than that acting on ferrite element 22. This element may take the form of a small square shim which is about one third the width of wall 112.

In operation, each ferrite element acts as a resonant coupling device affording directional coupling between the main and auxiliary guides. The directional properties of the elements are opposite to one another, owing to their placement on opposite sides of the center line of guide 11. Also, they have different resonant frequencies because, as aforementioned the magnetic fields acting on them are purposely made slightly different. Thus, if a source of microwave energy is applied to arm 115 of guide 11, and the frequency of the source is close to that of the resonant frequency of element 21, then the major portion of this energy will be coupled into arm 126 of guide 12 by element 21. Most of the remaining energy not coupled into arm 126 continues to propagate along guide 11 to arm 116. Very little of this energy is coupled out of arm 115 by element 22 because when element 21 is at resonance, element 22 is operating substantially off resonance. Virtually, no energy is coupled from arm 115 into arm 125 of guide 12 by means of element 21 because the direction of polarization of element 21 is such that it is incapable of exciting a mode which propagates in arm 125.

Now if the frequency of the source is changed so that it approximates the resonant frequency of element 22, most of the energy from arm 115 is coupled into arm 125. The remaining portion of the energy not so coupled continues to propagate along guide 11. As in the initial example, there is hardly any coupling to arm 126.

The ferrite elements act as they do because of Larmor precession. That is to say, the electrons in the ferrites have a magnetic moment or spin and because of this spin, they naturally tend to precess when subject to the action of a D.C. field. The plane of this precessional movement is at right angles to the field lines. Absent any other external agency, the motion is highly damped and ceases very rapidly once the electrons have lined up along the field axis. However, a rotating magnetic field having a frequency at or near the resonant frequency of the electrons will tend to support precession if the field is properly oriented. Such a field is produced by electromagnetic waves propagating in the main guide, where the elements 21 and 22 are located. The field rotates in the plane of the wall 13, which is at right angles to the D.C. field, and the direction of rotation is opposite for the two different ferrite elements due to the fact that they are located on the opposite sides of the center line of the guide 11. By reason of spin to spin coupling between the electrons in the ferrites, the excitation produced by this rotating field also serves to excite the electrons in the portions of the ferrites extending into the auxiliary guide which makes possible the coupling action described.

The application of the device as a discriminator to control, for example, the center frequency of an oscillator is illustrated diagrammatically in FIG. 3. Thus, arm 115 which is connected to a source 41 of microwave energy can be regarded as sampling the oscillator. Arm 116 which is coextensive with arm 115 is provided with a dummy load termination 42 so that all residual microwave energy not coupled into arms 125 and 126 of the auxiliary guide will be absorbed and none will be reflected. Terminating the arms of the auxiliary guide are detectors 46 and 47 which provide D.C. signals of opposite polarity representative of the magnitudes of the waves in these respective arms. The detected signals in turn are applied to a differential amplifier 49 whose output is used to control the frequency of the oscillator.

When the frequency of the oscillator is midway between the respective resonant frequencies of the ferrite elements, the amount of energy extracted from the main guide and transferred to arm 125 will be the same as that transferred to arm 126. Consequently, the output signals from the detectors 46 and 47 will be equal and opposite and there will be no signal present at the output of the differential amplifier. However, if the frequency of the oscillator changes so that it more nearly approximates the resonant frequency of one and less nearly the other of the elements, then the signal from one of the detectors, for example detector 46 will be greater in amplitude than the signal from detector 47. The result is an output voltage from the differential amplifier which reflects in amplitude and sense the deviation of the operating frequency from the mid-frequency of the ferrites. This mid-frequency is established by appropriate adjustment of the current in the coil of the magnet, to coincide with the desired frequency, and in this way, the signal derived from the output of the differential amplifier can be made to serve as an error signal for voltage control of the oscillator. Moreover, the desired frequency can be varied at will over a substantial range, for example over the entire X-band, simply by varying the current in the coil.

Although the invention has been described in terms of a single preferred embodiment, those skilled in the art will appreciate that this embodiment is susceptible of various alternatives and variants that are within the spirit and scope of the invention. Therefore, the invention should not be deemed to be limited to the details of what has been described herein by way of illustration, but rather it should be deemed to be limited only by the scope of the appended claims.

What is claimed is:

1. A frequency selective coupling device for electromagnetic waves, comprising a pair of rectangular waveguides disposed in overlapping relation so as to form a wall junction in which one of the broad walls of a first of the guides intersects at right angles with one of the broad walls of the second guide, a first of said guides having an input port and the second of said guides having a pair of output ports, said junction being provided with a pair of apertures communicating between the interiors of said guides at first and second locations, and said locations being displaced in the same direction with respect to the longitudinal axis of said second guide and in opposite directions with respect to the longitudinal axis of said first guide; a pair of ferrite coupling elements, means to mount said elements at the respective locations defined by said apertures, and means to produce a D.C. magnetic field acting upon said ferrite elements substantially at right angles to the plane of the intersection of said walls, said ferrite elements being adapted to resonate at slightly differing frequencies in the presence of said field.

2. The device according to claim 1 wherein said mounting means comprises a pair of insulators in the form of posts projecting essentially transversely of one said guides, and having said ferrite elements affixed to the tips thereof.

3. The device according to claim 1 wherein said apertures are round and said ferrite elements are spherical in shape and have a diameter which is in the vicinity of half that of the apertures.

4. The device according to claim 3 wherein said ferrite elements project beyond the apertures and into the interiors of said waveguides.

5. The device according to claim 4 wherein said apertures are equally spaced from the respective longitudinal axes of said waveguides.

6. The device according to claim 5 wherein the transverse dimensions of the broad waveguide walls are approximately four times as great as the transverse dimensions of the narrow waveguide walls in the region where the waveguides overlap.

7. The device according to claim 1 wherein said means to produce a D.C. magnetic field comprises an electromagnet having poles which extend adjacent the walls of said guide opposite the intersection thereof.

8. The device according to claim 7 including a magnetic circuit element disposed between one of said magnet poles and the waveguide wall adjacent thereto so as to increase the strength of the magnetic field acting on one of said ferrite elements relative to that acting on the other element.

References Cited by the Examiner

UNITED STATES PATENTS

| | | | |
|---|---|---|---|
| 3,016,495 | 1/1962 | Tien | 333—1.1 X |
| 3,128,439 | 4/1964 | Brown et al. | 333—10 X |
| 3,139,592 | 6/1964 | Sisson | 329—116 |
| 3,162,826 | 12/1964 | Engelbrecht | 333—1.1 |

HERMAN KARL SAALBACH, *Primary Examiner.*

P. L. GENSLER, *Assistant Examiner.*